(12) United States Patent
Kogo et al.

(10) Patent No.: US 12,507,956 B2
(45) Date of Patent: Dec. 30, 2025

(54) DROWSINESS ESTIMATION INFORMATION CORRECTION DEVICE, DROWSINESS ESTIMATION DEVICE, DROWSINESS ESTIMATION INFORMATION CORRECTION METHOD, DROWSINESS ESTIMATION METHOD, AND RECORDING MEDIUM

(71) Applicant: NEC Corporation, Tokyo (JP)

(72) Inventors: Takuma Kogo, Tokyo (JP); Masanori Tsujikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 905 days.

(21) Appl. No.: 17/628,294

(22) PCT Filed: Jul. 3, 2020

(86) PCT No.: PCT/JP2020/026222
§ 371 (c)(1),
(2) Date: Jan. 19, 2022

(87) PCT Pub. No.: WO2021/014939
PCT Pub. Date: Jan. 28, 2021

(65) Prior Publication Data
US 2022/0265217 A1 Aug. 25, 2022

(30) Foreign Application Priority Data
Jul. 22, 2019 (JP) .................................. 2019-134835

(51) Int. Cl.
*A61B 5/00* (2006.01)
*A61B 5/11* (2006.01)
(Continued)

(52) U.S. Cl.
CPC .......... *A61B 5/7203* (2013.01); *A61B 5/1103* (2013.01); *A61B 5/163* (2017.08);
(Continued)

(58) Field of Classification Search
CPC ..... A61B 5/7203; A61B 5/1103; A61B 5/165; A61B 2503/22; A61B 2560/0247;
(Continued)

(56) References Cited

U.S. PATENT DOCUMENTS

2016/0137059 A1* 5/2016 Mäder .................. B60K 28/066
340/575
2017/0020432 A1 1/2017 Kusukame et al.
(Continued)

FOREIGN PATENT DOCUMENTS

EP 3381351 A1 10/2018
JP 2017-127616 A 7/2017
(Continued)

OTHER PUBLICATIONS

International Search Report for PCT Application No. PCT/JP2020/026222, mailed on Sep. 1, 2020.

*Primary Examiner* — Abid A Mustansir
(74) *Attorney, Agent, or Firm* — Sughrue Mion, PLLC

(57) ABSTRACT

A drowsiness estimation information correction device includes: a drowsiness estimation information acquisition unit that acquires drowsiness estimation information that is based on an eyelid movement of a subject; and a drowsiness estimation information correction unit that calculates corrected drowsiness estimation information obtained by correcting the drowsiness estimation information with humidity information indicating humidity in a surrounding environment of the subject.

5 Claims, 10 Drawing Sheets

(51) Int. Cl.
  *A61B 5/16*    (2006.01)
  *A61B 5/18*    (2006.01)
  *G06T 7/246*   (2017.01)
  *G06V 20/59*   (2022.01)

(52) U.S. Cl.
  CPC ............... *A61B 5/165* (2013.01); *A61B 5/18* (2013.01); *G06T 7/246* (2017.01); *A61B 2503/22* (2013.01); *A61B 2560/0247* (2013.01); *A61B 2562/029* (2013.01); *G06T 2207/30201* (2013.01); *G06T 2207/30268* (2013.01); *G06V 20/597* (2022.01)

(58) Field of Classification Search
  CPC ...... A61B 2562/029; A61B 2560/0242; A61B 5/163; A61B 5/18; G06T 7/246; G06T 2207/30201; G06T 2207/30268; G06V 20/597; G06V 40/16; G06V 40/18
  See application file for complete search history.

(56) References Cited

U.S. PATENT DOCUMENTS

2020/0240670 A1    7/2020  Kitagawa et al.
2022/0160276 A1*   5/2022  Suzuki .................. G08B 21/06

FOREIGN PATENT DOCUMENTS

| JP | 2018-088966 A  |  6/2018 |
| JP | 2018-183532 A  | 11/2018 |
| JP | 2019-046012 A  |  3/2019 |
| JP | 2019-082282 A  |  5/2019 |
| JP | 6926636 B2 *   |  8/2021 |

* cited by examiner

| RELATIVE HUMIDITY | THRESHOLD VALUE $TH_1$ | THRESHOLD VALUE $TH_2$ | THRESHOLD VALUE $TH_3$ | THRESHOLD VALUE $TH_4$ |
|---|---|---|---|---|
| $0 \leq H < 40$ | $TH_1^1$ | $TH_2^1$ | $TH_3^1$ | $TH_4^1$ |
| $40 \leq H < 60$ | $TH_1^2$ | $TH_2^2$ | $TH_3^2$ | $TH_4^2$ |
| $60 \leq H < 100$ | $TH_1^3$ | $TH_2^3$ | $TH_3^3$ | $TH_4^3$ |

DROWSINESS ESTIMATION INFORMATION CORRECTION DEVICE, DROWSINESS ESTIMATION DEVICE, DROWSINESS ESTIMATION INFORMATION CORRECTION METHOD, DROWSINESS ESTIMATION METHOD, AND RECORDING MEDIUM

This application is a National Stage Entry of PCT/JP2020/026222 filed on Jul. 3, 2020, which claims priority from Japanese Patent Application 2019-134835 filed on Jul. 22, 2019, the contents of all of which are incorporated herein by reference, in their entirety.

TECHNICAL FIELD

The present invention relates to a drowsiness estimation information correction device, a drowsiness estimation device, a drowsiness estimation information correction method, a drowsiness estimation method, and a recording medium.

BACKGROUND ART

In relation to estimating the state of a person (subject), for example, Patent Document 1 discloses a mood estimation system for achieving a balance between a reduction in the load of calculation related to mood estimation and accuracy of mood estimation. The mood estimation system estimates the mood of a subject as a first mood value in a simple manner, on the basis of heart rate information only. This mood estimation system estimates a second mood value on the basis of the heart rate information and other information only when the first mood value deviates from a predetermined setting range.

PRIOR ART DOCUMENTS

Patent Documents

Patent Document 1: Japanese Unexamined Patent Application, First Publication No. 2018-88966

SUMMARY OF THE INVENTION

Problems to be Solved by the Invention

Estimating the drowsiness of a subject is one way of estimating the state of the subject, and when estimating the drowsiness of a subject, it is preferable that reduction in estimation accuracy degradation be possible.

An example object of the present invention is to provide a drowsiness estimation information correction device, a drowsiness estimation device, a drowsiness estimation information correction method, a drowsiness estimation method, and a recording medium which are capable of solving the problem mentioned above.

Means for Solving the Problem

According to a first example aspect of the present invention, a drowsiness estimation information correction device includes: a drowsiness estimation information acquisition means for acquiring drowsiness estimation information that is based on an eyelid movement of a subject; and a drowsiness estimation information correction means for calculating corrected drowsiness estimation information obtained by correcting the drowsiness estimation information with humidity information indicating humidity in a surrounding environment of the subject.

According to a second example aspect of the present invention, a drowsiness estimation device includes: an eyelid movement information acquisition means for acquiring information on an eyelid movement of a subject; and a drowsiness estimation means for calculating drowsiness estimation information of the subject, based on the information on the eyelid movement and humidity information indicating humidity in a surrounding environment of the subject.

According to a third example aspect of the present invention, a drowsiness estimation information correction method is executed by a computer and includes: acquiring drowsiness estimation information that is based on an eyelid movement of a subject; and calculating corrected drowsiness estimation information obtained by correcting the drowsiness estimation information with humidity information indicating humidity in a surrounding environment of the subject.

According to a fourth example aspect of the present invention, a drowsiness estimation method is executed by a computer and includes: acquiring information on an eyelid movement of a subject; and calculating drowsiness estimation information of the subject, based on the information on the eyelid movement and humidity information indicating humidity in a surrounding environment of the subject.

According to a fifth example aspect of the present invention, a recording medium stores a program for causing a computer to execute: acquiring drowsiness estimation information that is based on an eyelid movement of a subject; and calculating corrected drowsiness estimation information obtained by correcting the drowsiness estimation information with humidity information indicating humidity in a surrounding environment of the subject.

According to a sixth example aspect of the present invention, a recording medium stores a program for causing a computer to execute: acquiring information on an eyelid movement of a subject; and calculating drowsiness estimation information of the subject, based on the information on the eyelid movement and humidity information indicating humidity in a surrounding environment of the subject.

Effect of the Invention

According to an example embodiment of the present invention, it is possible to reduce degradation of estimation accuracy.

EXAMPLE EMBODIMENT

Hereinafter, example embodiments of the present invention are described; however, the present invention within the scope of the claims is not limited by the following example embodiments. Furthermore, all the combinations of features described in the example embodiments may not be essential for the solving means of the invention.

First Example Embodiment

Figure 1:
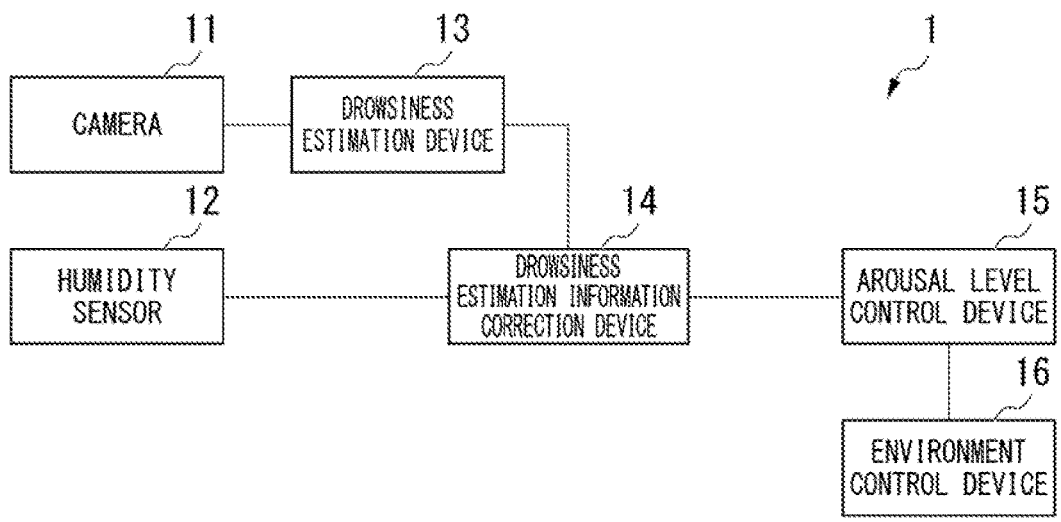
FIG. 1 is a schematic block diagram showing an example of a functional configuration of an arousal level control system according to a first example embodiment.

FIG. 1 is a schematic block diagram showing an example of a functional configuration of an arousal level control system according to a first example embodiment. In the configuration shown in FIG. 1, an arousal level control system 1 includes a camera 11, a humidity sensor 12, a drowsiness estimation device 13, a drowsiness estimation information correction device 14, an arousal level control device 15, and an environment control device 16.

The arousal level control system 1 estimates the drowsiness of a person (subject) and controls the arousal level of the subject on the basis of the estimation result. The subject referred to here is a person that is a subject of drowsiness estimation. Also, the arousal level referred to here is a degree indicating a low drowsiness level. That is to say, a high arousal level means a low drowsiness level (low drowsiness), and a low arousal level means a high drowsiness level (high drowsiness).

In particular, the arousal level control system 1 calculates corrected drowsiness estimation information, which is drowsiness estimation information that reflects the humidity in the surrounding environment of a subject. The arousal level control system 1 controls the arousal level of the subject on the basis of the obtained corrected drowsiness estimation information. The surrounding environment of the subject referred to here is the environment of a space in which the subject is located. The environment referred to here is the state of a space, and the environment referred to here includes the humidity.

The drowsiness estimation information referred to here is information indicating the degree of drowsiness estimated by the drowsiness estimation. Magnitude relations are defined for values that the drowsiness estimation information can take. The degree of drowsiness is indicated by the magnitude of the value of the drowsiness estimation information.

For example, the value of the drowsiness estimation information may indicate one of classes that classify the degree of drowsiness. A case where the value of the drowsiness estimation information indicates a class of the degree of drowsiness in this manner corresponds to an example of a case where the drowsiness estimation information takes discrete values.

Alternatively, the drowsiness estimation information may indicate the degree of drowsiness by a numerical value. A case where the drowsiness estimation information takes the real number value of a predetermined section such as [0, 1] can be taken as an example of the case where the drowsiness estimation information takes a continuous value. The [0, 1] indicates that the value is from 0 to 1.

For example, when the subject is a driver or operator of a vehicle such as an automobile, a railroad vehicle, a ship, or an aircraft, the surrounding environment of the subject may be the environment inside the vehicle, such as an automobile, a railroad vehicle, a ship, or an aircraft. Alternatively, the surrounding environment of the subject may be the environment of a part of the space within the vehicle, such as the environment of the driver's seat or the operator's seat.

Also, when the subject is a worker that performs operations inside a room, the surrounding environment of the subject may be the environment of the room in which the subject is present. Alternatively, the surrounding environment of the subject may be the environment of a part of the space within the room, such as the environment of the subject's seat.

The camera 11 captures an image including an image of the subject's eye.

For example, when the subject is a driver or operator of a vehicle such as an automobile, a railroad vehicle, a ship, or an aircraft, the camera 11 may be installed in front of the driver's seat or the operator's seat, facing the driver's seat or the operator's seat, so as to capture the image of the face of the driver or operator.

Alternatively, when the subject is a worker that performs operations while looking at a display (display device) in a room, the camera 11 may be provided on the display used by the subject, so as to capture the image of the face of the subject located in front of the display.

The camera 11 may capture a moving image. Alternatively, the camera 11 may periodically capture a still image, for example, at 5 second intervals.

The camera 11 may output image data that indicates the captured image. In such a case, the image data output by the camera 11 corresponds to an example of eyelid movement information of the subject. The eyelid movement information is information that indicates the movement of an eyelid. The eyelid movement information is also referred to as eyelid motion information or simply movement information.

Alternatively, the camera 11 may have an image processing function and extract the feature of an eyelid movement from the captured image and output time-series information of the extracted feature. In such a case, the feature output from the camera 11 corresponds to an example of eyelid movement information of the subject. As a feature indicating the movement of an eyelid (feature of eyelid movement), various information may be used such as information indicating the degree to which the eye is open during a certain period, information indicating the frequency of blinks, information indicating the period of time during which the eye is closed, or a combination thereof. Thus, the feature extracted by the camera 11 is not particularly limited to specific information. Moreover, the process of extracting movement information may be realized by using a device different from the camera 11.

For example, the camera 11 may extract the feature described later in the description of the process of the drowsiness estimation device 13. That is to say, either the camera 11 or the drowsiness estimation device 13 may extract the feature.

The drowsiness estimation device 13 estimates the drowsiness of a subject on the basis of the movement information of an eyelid of the subject output by the camera 11. Specifically, the drowsiness estimation device 13 calculates and outputs drowsiness estimation information of the subject. As described above, the drowsiness estimation information is information indicating the degree of drowsiness by the magnitude of the value, and may be defined so that the higher the drowsiness is, the greater the value of the drowsiness estimation information becomes. Alternatively, it may be defined so that the higher the drowsiness is, the smaller the value of the drowsiness estimation information becomes.

An example of the processing performed by the drowsiness estimation device 13 will be described later. However, the drowsiness estimation device 13 is not limited to a specific device as long as it calculates the drowsiness estimation information of a subject on the basis of the eyelid movement of the subject. An existing drowsiness estimation device may also be used as the drowsiness estimation device 13.

The drowsiness estimation device 13 corresponds to an example of a drowsiness estimation information acquisition unit (drowsiness estimation information acquisition means).

The humidity sensor 12 is a sensor that measures humidity and outputs humidity information. The humidity information referred to here is information indicating the humidity (information indicating the level of humidity).

The humidity sensor 12 may output the latest measured humidity value itself as humidity information. Alternatively, the humidity sensor 12 may output a value obtained by averaging humidity measurement values falling within a predetermined time window $T_H$ as humidity information, that is to say, may output a value obtained by processing humidity measurement values as a humidity measurement value.

The humidity information output by the humidity sensor 12 is used as information indicating the humidity in the surrounding environment of the subject.

The installation position of the humidity sensor 12 is not limited to a specific position as long as it allows measurement of humidity in the space where the subject is located. While a position in the vicinity of the subject's eye is more preferred as the installation position of the humidity sensor 12, the example embodiment is not limited to such an example.

For example, when the subject is a driver or operator of a vehicle such as an automobile, a railroad vehicle, a ship, or an aircraft, the humidity sensor 12 may be installed in the interior of the vehicle, such as an automobile, a railroad vehicle, a ship, or an aircraft. In particular, the humidity sensor 12 may be installed on the driver's seat or the operator's seat.

Also, when the subject is a worker that performs operations inside a room, the humidity sensor 12 may be installed inside the room in which the subject is present. In particular, the humidity sensor 12 may be installed on the subject's seat.

The humidity sensor 12 may be installed at the subject's eye level. Alternatively, the humidity sensor 12 may be installed at the subject's chest level.

The humidity sensor 12 may measure relative humidity [%]. Alternatively, the humidity sensor 12 may measure absolute humidity [g/m$^3$].

The humidity sensor 12 periodically measures humidity and outputs humidity information. The time intervals at which the humidity sensor 12 measures humidity is not limited to a specific interval. For example, the humidity sensor 12 may measure humidity at regular intervals of several minutes to several tens of minutes and output humidity information each time measurement is performed.

The drowsiness estimation information correction device 14 performs correction so as to reflect the humidity in the surrounding environment of the subject, on drowsiness estimation information calculated by the drowsiness estimation device 13.

Here, as a result of conducting an experiment of drowsiness estimation, a correlation was found between the movement of a person's eyelid and the humidity in the person's surrounding environment. According to this correlation, it was made clear that the accuracy of drowsiness estimation would be reduced, depending on the state of the surrounding environment.

In particular, when the humidity in the surrounding environment was low, the eyelid moved more than usual due to the dryness of the eye, and as a result, the drowsiness level was estimated higher than it actually was.

For this reason, the drowsiness estimation information correction device 14 performs correction so as to reflect the humidity in the surrounding environment of the subject, on the drowsiness estimation information calculated by the drowsiness estimation device 13. As a result, the arousal level control system 1 can reduce the accuracy degradation in estimation associated with the influence of the surrounding environment, when calculating the drowsiness estimation information of the subject. Specifically, the arousal level control system 1 can reduce the accuracy degradation in estimation associated with the influence of humidity in the subject's surrounding environment.

It should be noted that an increase in eyelid movement may be any one of: an increase in the frequency of eyelid movement; an increase in the degree to which the eyelid opens (that is, an increase in the eye-opening width); an increase in the speed of eyelid movement; and an increase in the period of time during which the eyelid is closed within a single blink, or may be a combination thereof.

Figure 2:
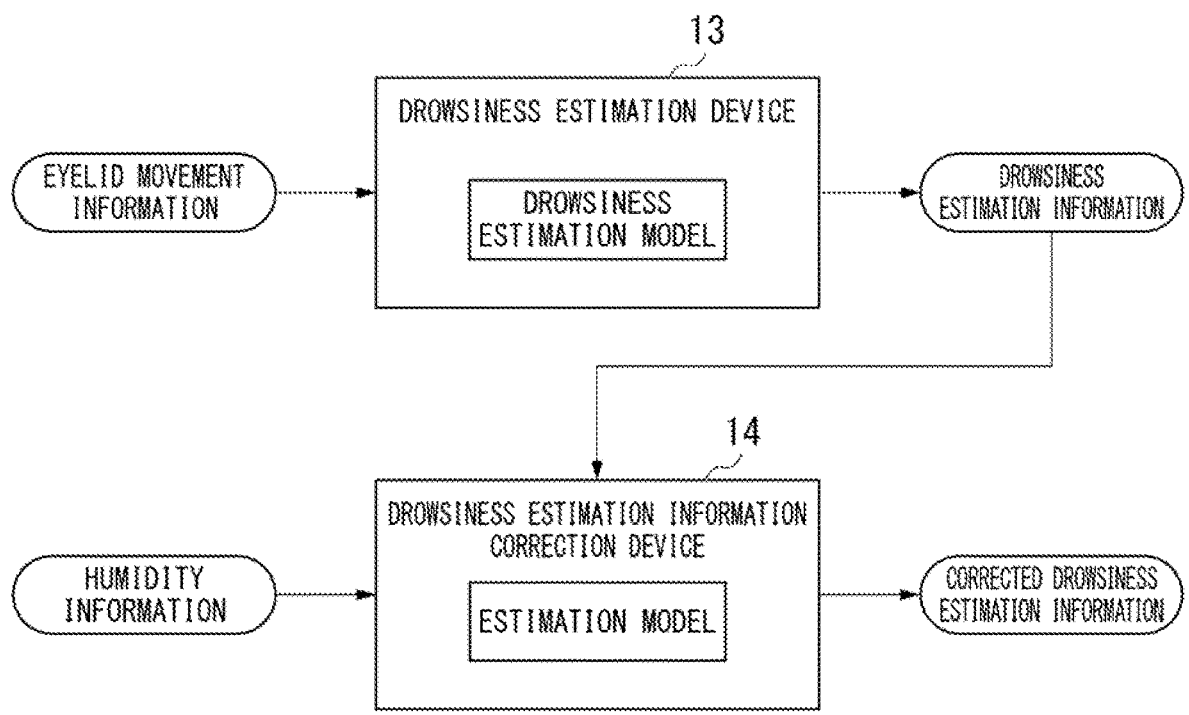
FIG. 2 is a diagram showing an example of data input/output in a drowsiness estimation device and a drowsiness estimation information correction device according to the first example embodiment.

FIG. 2 is a diagram showing an example of data input/output in the drowsiness estimation device 13 and the drowsiness estimation information correction device 14.

In the example of FIG. 2, the drowsiness estimation device 13 acquires eyelid movement information. As described above, the drowsiness estimation device 13 may acquire image data including an image of the eyelid as eyelid movement information.

Alternatively, the drowsiness estimation device 13 may acquire a feature of eyelid movement as eyelid movement information.

The drowsiness estimation device 13 applies the acquired eyelid movement information to a drowsiness estimation model to calculate drowsiness estimation information. The drowsiness estimation model is a model that outputs drowsiness estimation information in response to an input of eyelid movement information.

The form of expression of the drowsiness estimation model included in the drowsiness estimation device 13 is not limited to a specific format.

For example, the drowsiness estimation device 13 may include a drowsiness estimation model expressed in the form of a mathematical equation; however, the example embodiment is not limited to such an example.

The drowsiness estimation information correction device 14 acquires the drowsiness estimation information calculated by the drowsiness estimation device 13 and humidity information. The drowsiness estimation information correction device 14 may acquire a humidity measurement value itself as humidity information. Alternatively, the drowsiness estimation information correction device 14 may acquire a value obtained by processing a humidity measurement value as humidity information.

The drowsiness estimation information correction device 14 applies the acquired drowsiness estimation information and humidity information to a correction model to thereby perform correction that takes the influence of humidity into consideration on the drowsiness estimation information, and outputs the corrected drowsiness estimation information. The correction model is a model that outputs corrected drowsiness estimation information in response to an input of drowsiness estimation information and humidity information.

The form of expression of the correction model included in the drowsiness estimation information correction device 14 is not limited to a specific format. For example, the drowsiness estimation information correction device 14 may include a correction model expressed in the form of a mathematical equation; however, the example embodiment is not limited to such an example.

The corrected drowsiness estimation information output by the drowsiness estimation information correction device 14 is referred to as corrected drowsiness estimation information.

Figure 3:
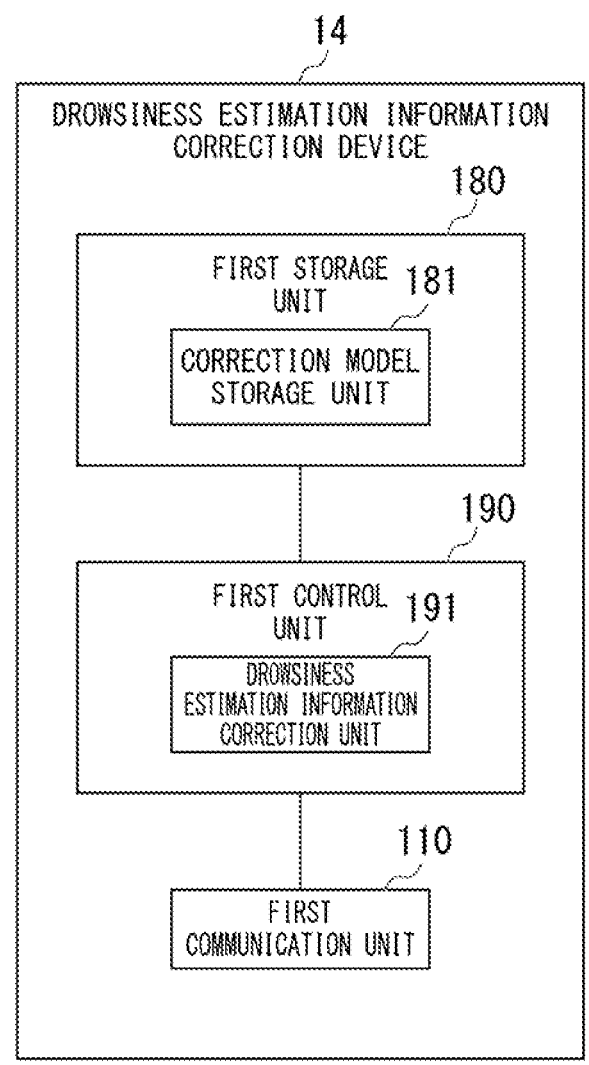
FIG. 3 is a schematic block diagram showing an example of a functional configuration of the drowsiness estimation information correction device according to the first example embodiment.

FIG. 3 is a schematic block diagram showing an example of a functional configuration of the drowsiness estimation information correction device 14. In the configuration shown in FIG. 3, the drowsiness estimation information correction device 14 includes a first communication unit 110, a first storage unit 180, and a first control unit 190. The first storage unit 180 includes a correction model storage unit 181. The first control unit 190 includes a drowsiness estimation information correction unit 191.

The first communication unit 110 communicates with other devices. In particular, the first communication unit 110 receives drowsiness estimation information from the drowsiness estimation device 13. Moreover, the first communication unit 110 receives humidity information from the humidity sensor 12. Also, the first communication unit 110 transmits corrected drowsiness estimation information to the arousal level control device 15.

The first storage unit 180 stores various types of information. Functions of the first storage unit 180 are executed, using a storage device included in the arousal level control system 1.

The correction model storage unit 181 stores a correction model. As described above, the correction model is a model that outputs corrected drowsiness estimation information in response to an input of drowsiness estimation information and humidity information.

The first control unit 190 controls each unit of the drowsiness estimation information correction device 14 and executes various processes. Functions of the first control unit 190 are executed by a CPU (central processing unit) included in the drowsiness estimation information correction device 14 reading out a program from the first storage unit 180 and executing the program.

The drowsiness estimation information correction unit 191 performs correction that takes the influence of humidity into consideration on drowsiness estimation information, and calculates corrected drowsiness estimation information. Specifically, the drowsiness estimation information correction unit 191 reads out the correction model from the correction model storage unit 181. The drowsiness estimation information correction unit 191 applies, to the correction model, drowsiness estimation information from the drowsiness estimation device 13 and humidity information obtained the humidity sensor 12, and acquires corrected drowsiness estimation information.

The corrected drowsiness estimation information output by the drowsiness estimation information correction unit 191 may be a continuous value or a discrete value.

Figures 4, 5:
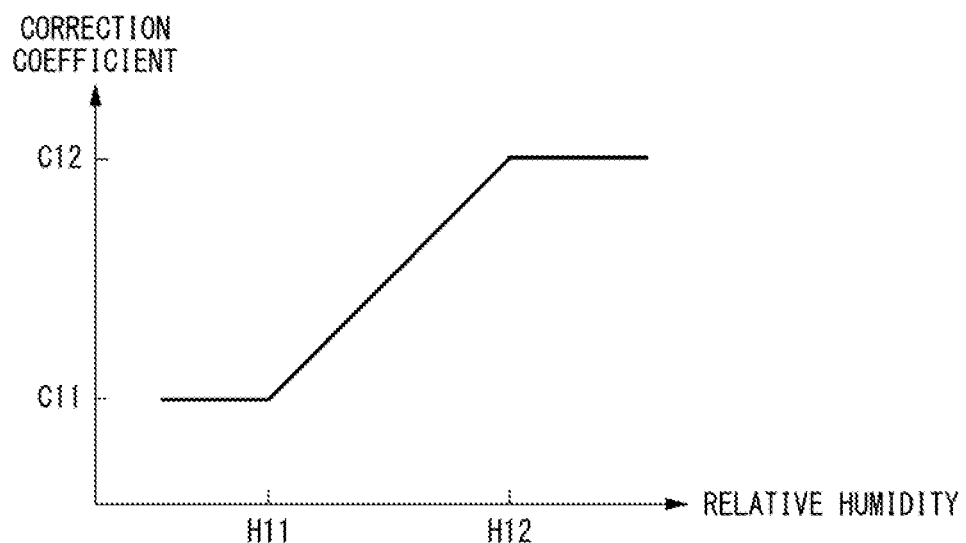
FIG. 4 is a diagram showing an example of correction performed when the drowsiness estimation information correction unit according to the first example embodiment outputs corrected drowsiness estimation information of continuous values.
FIG. 5 is a diagram showing an example of correction performed when the drowsiness estimation information correction unit according to the first example embodiment outputs corrected drowsiness estimation information of discrete values.

FIG. 4 is a diagram showing an example of the correction performed when the drowsiness estimation information correction unit 191 outputs corrected drowsiness estimation information of continuous values. The horizontal axis of the graph in FIG. 4 represents relative humidity. The vertical axis represents correction coefficients.

FIG. 4 shows an example of a case where the drowsiness estimation information becomes greater as drowsiness becomes higher. Moreover, in the example of FIG. 4, threshold values C11 and C12 of the correction coefficient value are set to "0<C11<C12<1".

The drowsiness estimation information correction unit 191 acquires the correction coefficient value associated with the humidity indicated by humidity information in the graph of FIG. 4. The drowsiness estimation information correction unit 191 multiplies the acquired correction coefficient value by drowsiness estimation information (pre-correction value) to calculate corrected drowsiness estimation information.

The graph of FIG. 4 corresponds to an example of portion of the correction model. The combination of the graph of FIG. 4 and the equation for multiplying the drowsiness estimation information by the correction coefficient value corresponds to an example of the correction model.

Here, when the humidity is low, the subject repeatedly blinks or closes their eye as they feel the dryness of the eye, and this tends to result in the value of the drowsiness estimation information becoming greater than their actual drowsiness (for example, the drowsiness the subject is experiencing).

Thus, the drowsiness estimation information correction unit 191 calculates the correction coefficient value to be smaller as the humidity becomes lower, making the drowsiness estimation information lower (estimates that drowsiness is low). The amount of correction performed by the drowsiness estimation information correction unit 191 (the amount of decrease to be made from the original drowsiness estimation information) increases as humidity decreases.

On the other hand, in the graph of FIG. 4, when the humidity is H11 or lower, the correction coefficient is a constant value (C11). This is because when the humidity drops below a certain level, the influence of humidity on the eyelid movement is considered to stay the same even if the humidity drops further.

Moreover, in the graph of FIG. 4, when the humidity is H12 or higher, the correction coefficient is a constant value (C12). This is because when the humidity becomes higher than a certain level, the influence of humidity on the eyelid movement is considered to stay the same even if the humidity becomes even higher.

However, the correction method shown in FIG. 4 is an example, and the example embodiment is not limited to such an example. For example, although FIG. 4 shows an example in which the drowsiness estimation information correction unit 191 performs correction using a piecewise linear function, a nonlinear function may be used to perform correction. Here, correction of drowsiness estimation information performed by the drowsiness estimation information correction unit 191 is expressed as "E'=f (E, H)" where E represents pre-correction drowsiness estimation information, E' represents corrected drowsiness estimation information, H represents humidity, and f represents a nonlinear function. Various nonlinear functions f, in which E' is less than E and E-E' becomes greater as H becomes smaller, can be used for correction of drowsiness estimation information performed by the drowsiness estimation information correction unit 191.

In this case also, as in the example of FIG. 4, when the humidity is equal to or less than a lower limit threshold value, the value of E-E' may not change (the correction amount may not change). In the example of FIG. 4, H11 corresponds to an example of the lower limit threshold value.

Moreover, as in the example of FIG. 4, when the humidity is equal to or greater than an upper limit threshold value, the value of E-E' may not change (the correction amount may not change). In the example of FIG. 4, H12 corresponds to an example of the upper limit threshold value.

FIG. 5 is a diagram showing an example of the correction performed when the drowsiness estimation information correction unit 191 outputs corrected drowsiness estimation information of discrete values. The data table shown in FIG. 5 corresponds to an example of a correction model.

FIG. 5 shows an example of the correspondence between the humidity (relative humidity) indicated by humidity information and the threshold value used for classification of drowsiness estimation information. In the example of FIG. 5, when the relative humidity H is "0%≤H<40%", four values, $TH_1^1$, $TH_2^1$, $TH_3^1$, and $TH_4^1$ are used as threshold values. When the relative humidity H is "40%≤H<60%", four values, $TH_1^2$, $TH_2^2$, $TH_3^2$, and $TH_4^2$ are used as threshold values. When the relative humidity H is "60%≤H<100%", four values, $TH_1^3$, $TH_2^3$, $TH_3^3$, and $TH_4^3$ are used as threshold values.

Here, let i be an integer satisfying "1≤i≤3" and j be an integer satisfying "1≤j≤3", and the correlation between $TH_i^j$ and $TH_{i+1}^j$ is expressed as Equation (1).

[Equation 1]

$$TH_i^j < TH_{i+1}^j \qquad (1)$$

By applying this threshold value to the drowsiness estimation information, the drowsiness of the subject is estimated to be at one of five levels.

Moreover, in the case where the higher the drowsiness is, the greater the drowsiness estimation information is calculated to be, let i be an integer satisfying "1≤i≤3" and j be an integer satisfying "1≤j≤3", and the correlation between $TH_i^j$ and $TH_i^{j+1}$ is expressed as Equation (2).

[Equation 2]

$$TH_i^j \leq TH_i^{j+1} \qquad (2)$$

Accordingly, if the level of drowsiness indicated by the pre-correction drowsiness estimation information is the same, the lower the humidity is, the lower the level of drowsiness indicated by the corrected drowsiness estimation information becomes.

Alternatively, in the case where the higher the drowsiness is, the smaller the drowsiness estimation information is calculated to be, the threshold value is set so that the correlation of Equation (3) holds instead of Equation (2).

[Equation 3]

$$TH_i^j \geq TH_i^{j+1} \qquad (3)$$

Accordingly, if the level of drowsiness indicated by the pre-correction drowsiness estimation information is the same, the lower the humidity is, the lower the level of drowsiness indicated by the corrected drowsiness estimation information becomes.

The environment control device 16 is a device that changes a physical quantity in the surrounding environment of the subject. Here, the physical quantity in the surrounding environment of the subject may be any physical quantity that affects the drowsiness of the subject. For example, the environment control device 16 may be an air conditioning device, and may adjust the temperature (air temperature) in the surrounding environment of the subject. Alternatively, the environment control device 16 may be an illuminating device, and may adjust the luminance in the surrounding environment of the subject.

The arousal level control device 15 controls the environment control device 16, thereby controlling the arousal level of the subject. The arousal level referred to here is a concept paired with drowsiness level, and the higher the arousal level, the lower the drowsiness level. For example, when the arousal level of the subject is low (drowsiness level is high), the arousal level control device 15 may control the environmental control device 16 to thereby increase the arousal level of the subject (to thereby lower the drowsiness level).

Figure 6:
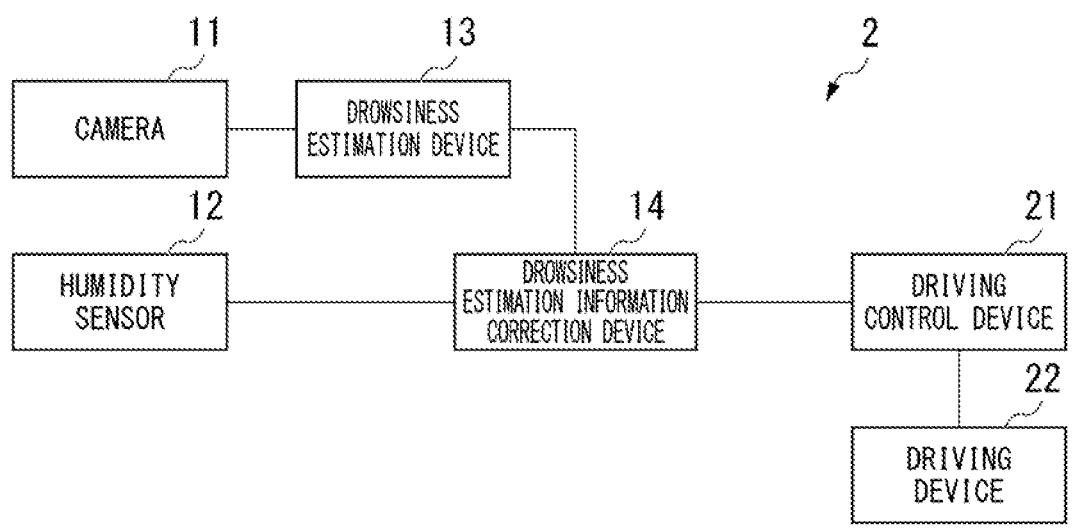
FIG. 6 is a diagram showing an example of a driving control system according to the first example embodiment.

FIG. 6 is a schematic block diagram showing an example of a functional configuration of a driving control system according to the first example embodiment. In the configuration shown in FIG. 6, a driving control system 2 includes a camera 11, a humidity sensor 12, a drowsiness estimation device 13, a drowsiness estimation information correction device 14, a driving control device 21, and a driving device 22.

Of these components shown in FIG. 6, ones corresponding to those in FIG. 1 and having similar functions are given the same reference symbols (11, 12, 13, and 14), and descriptions thereof are omitted.

The driving control system 2 controls driving operations of a vehicle such as an automobile, a railroad vehicle, a ship or an aircraft. Specifically, the driving control system 2 estimates the drowsiness of a subject, the subject being the driver or the operator of the control target vehicle. In the case where the drowsiness level of the subject is determined as being equal to or higher than a predetermined condition, the driving control system 2 controls the control target vehicle so as to cope with a case where the subject becomes unable to appropriately drive or operate the vehicle due to the drowsiness. For example, the driving control system 2 may limit the speed of the control target vehicle to reduce the braking distance, or may switch the driving of the control target vehicle to automatic driving. However, the control of the control target vehicle performed by the driving control system 2 is not limited to these example.

The driving device 22 includes any of a driving device of the control target vehicle such as an engine or a motor, a braking device (brake) of the control target vehicle, or a steering device of the control target vehicle, or a combination thereof, and is the control target of the driving control device 21.

The driving control device 21 determines whether or not the drowsiness level of the subject is equal to or higher than a predetermined condition, on the basis of corrected drowsiness estimation information from the drowsiness estimation information correction device 14. The driving control device 21 may compare the corrected drowsiness estimation information with a predetermined threshold value to determine whether or not the drowsiness level of the subject is equal to or higher than the threshold value; however, the example embodiment is not limited to such an example.

In the case where the drowsiness level of the subject is determined as being equal to or higher than a predetermined condition, the driving control system 2 controls the driving device 22 so as to cope with a case where the subject becomes unable to appropriately drive or operate the vehicle due to the drowsiness.

For example, the driving device 22 may include at least either of a driving device and a braking device, and the driving control device 21 may control the driving device 22 so as to limit the speed of the control target vehicle. For example, the driving device 22 may control the driving device 22 so that the speed of the control target vehicle is at a constant speed or therebelow. Alternatively, the driving control device 21 may control the driving device 22 so as to cause the control target vehicle to decelerate.

Alternatively, the driving device 22 may include the braking device, and the driving control device 21 may control the driving device 22 so as to cause the braking device to prefill. Here, prefilling the braking device means reducing the play of the braking device to thereby advance the start of the braking operation.

Or, the driving device 22 may include the drive device, the braking device and the steering device of the control target vehicle, and the driving control device 21 may control the driving device 22 to perform automatic driving of the control target vehicle.

The driving control device 21 may be configured as a brake system such as an anti-lock brake system, an automatic brake prefill system, a brake assist system, and a collision mitigation brake system. Alternatively, the driving control device 21 may be configured as a cruise control system. The cruise control system referred to here is a system that maintains the speed of the control target vehicle at a constant speed. Or, the driving control device 21 may be configured as an automatic driving system. Alternatively, the driving control device 21 may be configured as a system separate from these systems.

Figure 7:
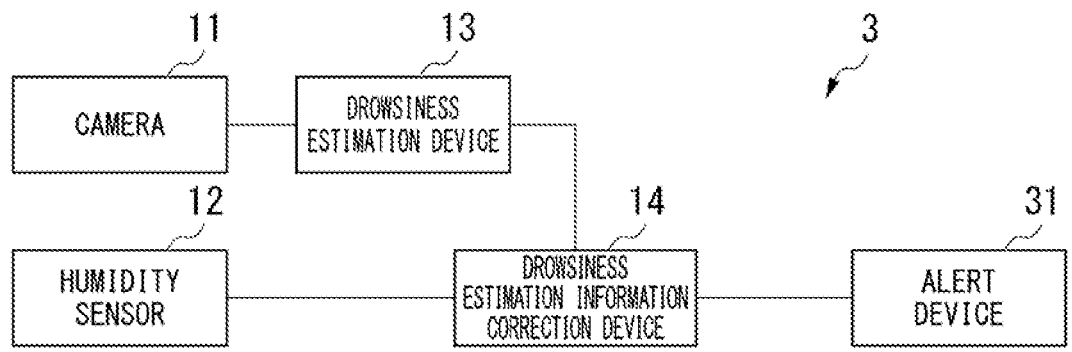
FIG. 7 is a diagram showing an example of an alert system according to the first example embodiment.

FIG. 7 is a schematic block diagram showing an example of a functional configuration of an alert system according to the first example embodiment. In the configuration shown in FIG. 7, an alert system 3 includes a camera 11, a humidity sensor 12, a drowsiness estimation device 13, a drowsiness estimation information correction device 14, and an alert device 31.

Of the components shown in FIG. 7, ones corresponding to those in FIG. 1 and having similar functions are given the same reference symbols (11, 12, 13, and 14), and descriptions thereof are omitted.

The alert system 3 is a system that estimates the drowsiness of the subject and outputs an alert when the drowsiness level is determined as being equal to or higher than a predetermined condition.

For example, the subject may be a driver or operator of a vehicle such as an automobile, a railroad vehicle, a ship, or an aircraft. In such a case, with the alert system 3 outputting an alarm, it is possible to reduce the subject's drowsiness (that is to say, rouses the subject) at least temporarily, and reduce the possibility of the subject becoming unable to appropriately perform driving due to the drowsiness.

The alert device 31 determines whether or not the drowsiness level of the subject is equal to or higher than a predetermined condition, on the basis of corrected drowsiness estimation information from the drowsiness estimation information correction device 14. The alert device 31 may compare the corrected drowsiness estimation information with a predetermined threshold value to determine whether or not the drowsiness level of the subject is equal to or higher than the threshold value; however, the example embodiment is not limited to such an example.

In the case where the drowsiness level of the subject is determined as being equal to or higher than a predetermined condition, the alert device 31 outputs an alert.

The method for the alert device 31 to output an alert is not limited to a specific method. For example, the alert device 31 may include an audio output device such as a speaker or a buzzer and output an alert message or an alert sound. Alternatively, the alert device 31 may visually output an alert, such as displaying an alert message on a display or turning on a lamp. The alert device 31 may output an audible alert and a visual alert together.

Also, the alert system 3 may output a message prompting the subject to move the vehicle to a safe place and have a sleep.

According to the configuration in which the drowsiness estimation information correction device 14 is provided as in the configuration example of FIG. 1, when performing machine learning on the drowsiness estimation information calculation process performed by the drowsiness estimation device 13, information that combines the feature indicating an eyelid movement and the arousal level at the time of the movement can be used as learning data.

In particular, according to the configuration in which the drowsiness estimation information correction device 14 is provided, the machine learning of the drowsiness estimation information calculation process performed by the drowsiness estimation device 13 and the machine learning of the correction process performed by the drowsiness estimation information correction device 14 can each serve as a separate machine learning process. Therefore, the machine learning of the drowsiness estimation information calculation process performed by the drowsiness estimation device 13 does not require humidity information.

Here, no research report is found on the correlation between drowsiness of a subject and humidity in addition to the movement of the subject's eyelid. Therefore, no data showing the correlation between drowsiness of a subject and humidity in addition to the movement of the subject's eyelid is found.

According to the configuration in which the drowsiness estimation information correction device 14 is provided, for machine learning of the drowsiness estimation information calculation process performed by the drowsiness estimation device 13, a model that has already been created can be used and there is no need to acquire new data.

Alternatively, as the drowsiness estimation device 13, it is possible to use a device that calculates drowsiness estimation information on the basis of the movement of the eyelid of the subject. That is to say, a model generally known as a drowsiness estimation model can be used. In such a case, there is no need for newly performing machine learning of the drowsiness estimation information calculation process performed by the drowsiness estimation device 13.

As described above, the drowsiness estimation device 13 acquires drowsiness estimation information on the basis of an eyelid movement of a subject. The drowsiness estimation information correction unit 191 calculates corrected drowsiness estimation information obtained by correcting the drowsiness estimation information with humidity information indicating the humidity in the surrounding environment of the subject.

As a result, in the drowsiness estimation information correction device 14, it is possible to reduce degradation of estimation accuracy when estimating drowsiness of a subject. In particular, in the drowsiness estimation information correction device 14, it is possible to avoid or reduce degradation of drowsiness estimation accuracy caused by the influence of humidity in the subject's surrounding environment.

Moreover, the drowsiness estimation information correction unit 191 performs correction so that the lower the humidity is, the smaller the corrected drowsiness estimation information becomes.

As a result, in the drowsiness estimation information correction device 14, it is possible to reduce the possibility of determining the drowsiness level being higher than it actually is as a result of the action of the subject feeling eye dryness and blinking or closing their eye.

Moreover, when the humidity is higher than an upper limit threshold value, the drowsiness estimation information correction unit 191 performs correction of the same correction amount as that in a case where the humidity is the upper limit threshold value.

As a result, the drowsiness estimation information correction device 14 can estimate drowsiness more accurately, reflecting that the influence on the eyelid movement is the same when the humidity is higher than the upper limit threshold value.

Moreover, when the humidity is lower than a lower limit threshold value, the drowsiness estimation information correction unit 191 performs correction of the same correction amount as that in a case where the humidity is the lower limit threshold value.

As a result, the drowsiness estimation information correction device 14 can estimate drowsiness more accurately, reflecting that the influence on the eyelid movement is the same when the humidity is higher than the lower limit threshold value.

Second Example Embodiment

In place of the drowsiness estimation device 13 and the drowsiness estimation information correction device 14, a drowsiness estimation device that outputs drowsiness estimation information in consideration of the influence of humidity may be provided.

Figure 8:
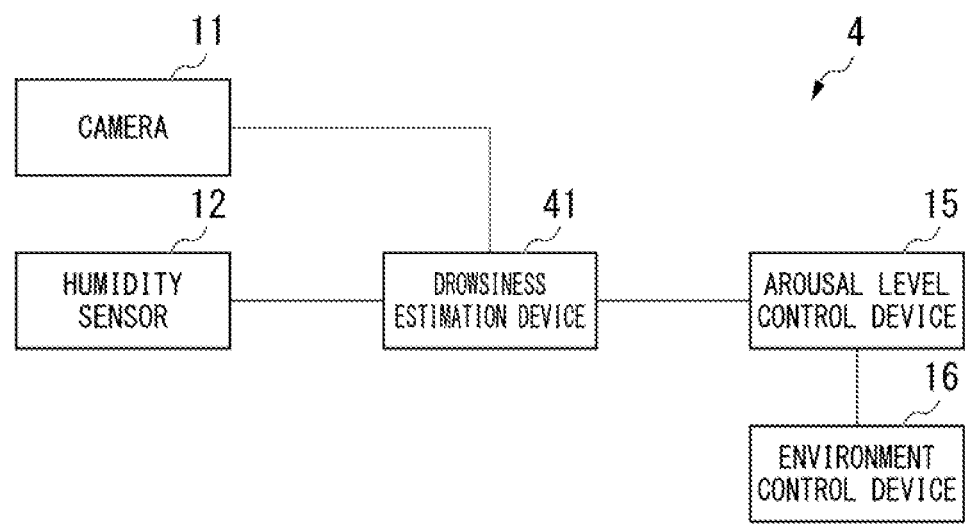
FIG. 8 is a diagram showing an example of a drowsiness estimation device according to a second example embodiment.

FIG. 8 is a diagram showing an example of an arousal level control system according to a second example embodiment. In the configuration shown in FIG. 8, an arousal level control system 4 includes a camera 11, a humidity sensor 12, a drowsiness estimation device 41, an arousal level control device 15, and an environment control device 16.

Of the components shown in FIG. 8, ones corresponding to those in FIG. 1 and having similar functions are given the same reference symbols (11, 12, 15, and 16), and descriptions thereof are omitted.

The arousal level control system 4 of FIG. 8 differs from the arousal level control system 1 of FIG. 1 in that the drowsiness estimation device 41 is provided in place of the drowsiness estimation device 13 and the drowsiness estimation information correction device 14.

In other respects, the arousal level control system 4 is similar to the arousal level control system 1. In particular, as in the case of the arousal level control system 1, as drowsiness estimation information, the arousal level control system 4 calculates corrected drowsiness estimation information that reflects the humidity in the surrounding environment of the subject. As in the case of the arousal level control system 1, the arousal level control system 4 controls the arousal level of the subject on the basis of the calculated corrected drowsiness estimation information.

The drowsiness estimation device 41 calculates corrected drowsiness estimation information. Specifically, the drowsiness estimation device 41 calculates corrected drowsiness estimation information, using a drowsiness estimation model that outputs corrected drowsiness estimation information in response to an input of eyelid movement information and humidity information.

Figure 9:
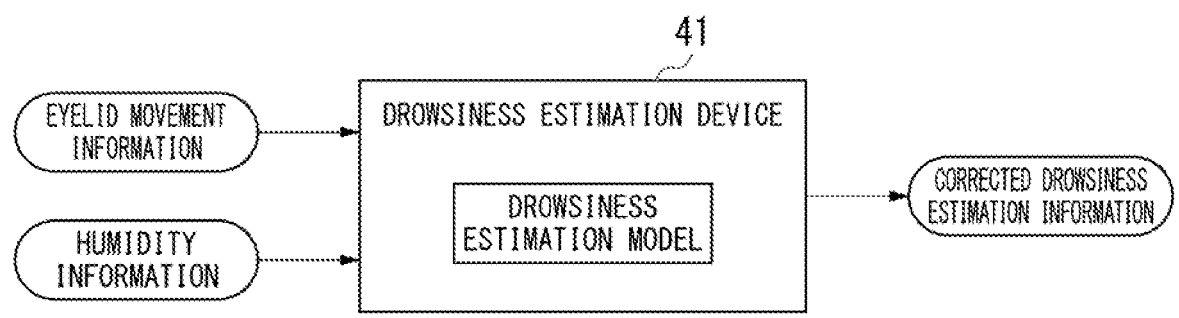
FIG. 9 is a diagram showing an example of data input/output in the drowsiness estimation device according to the second example embodiment.

FIG. 9 is a diagram showing an example of data input/output in the drowsiness estimation device 41.

In the example of FIG. 9, the drowsiness estimation device 41 acquires eyelid movement information and humidity information. The drowsiness estimation device 41 applies the acquired eyelid movement information and humidity information to a drowsiness estimation model to calculate drowsiness estimation information. The drowsiness estimation device 41 calculates the drowsiness estimation information that reflects the influence of humidity, using a model that reflects the influence of humidity.

Figure 10:
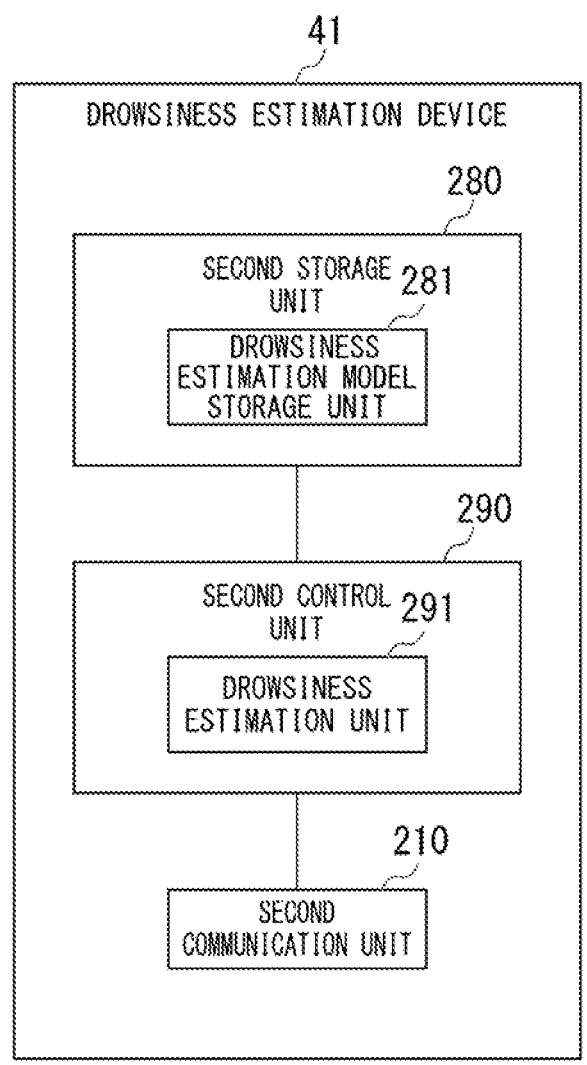
FIG. 10 is a function block diagram showing an example of a functional configuration of the drowsiness estimation device according to the second example embodiment.

FIG. 10 is a schematic block diagram showing an example of a functional configuration of the drowsiness estimation device 41. In the configuration shown in FIG. 10, the drowsiness estimation device 41 includes a second communication unit 210, a second storage unit 280, and a second control unit 290. The second storage unit 280 includes a drowsiness estimation model storage unit 281. The second control unit 290 includes a drowsiness estimation unit 291.

The second communication unit 210 communicates with other devices. In particular, the second communication unit 210 receives eyelid movement information from the camera 11. The second communication unit 210 corresponds to an example of an eyelid movement information acquisition unit (eyelid movement information acquisition means). Moreover, the second communication unit 210 receives humidity information from the humidity sensor 12. Also, the second communication unit 210 transmits corrected drowsiness estimation information to the arousal level control device 15.

The second storage unit 280 stores various types of information. Functions of the second storage unit 280 are executed, using a storage device included in the arousal level control system 1.

The drowsiness estimation model storage unit 281 stores a drowsiness estimation model that outputs corrected drowsiness estimation information in response to an input of eyelid movement information and humidity information. This drowsiness estimation model corresponds to the combination of the drowsiness estimation model included in the drowsiness estimation device 13 of the first example embodiment and the correction model included in the drowsiness estimation information correction device 14.

The drowsiness estimation model stored in the drowsiness estimation model storage unit 281 may be a model that outputs corrected drowsiness estimation information directly (without calculating pre-correction drowsiness estimation information) in response to an input of eyelid movement information and humidity information. Alternatively, the drowsiness estimation model stored in the drowsiness estimation model storage unit 281 may be a model that calculates pre-correction drowsiness estimation information on the basis of eyelid movement information, and that calculates corrected drowsiness estimation information by correcting drowsiness estimation information on the basis of humidity information.

The second control unit 290 controls each unit of the drowsiness estimation device 41 and executes various processes. Functions of the second control unit 290 are executed by a CPU included in the drowsiness estimation device 41 reading out a program from the second storage unit 280 and executing the program.

The drowsiness estimation unit 291 calculates corrected drowsiness estimation information on the basis of eyelid movement information and humidity information. Specifically, the drowsiness estimation unit 291 reads out a drowsiness estimation model from the drowsiness estimation model storage unit 281. The drowsiness estimation unit 291 then applies eyelid movement information from the camera 11 and humidity information from the humidity sensor 12 to the drowsiness estimation model, and acquires corrected drowsiness estimation information.

The corrected drowsiness estimation information output by the drowsiness estimation unit 291 is similar to the corrected drowsiness estimation information output by the drowsiness estimation information correction unit 191 of the first example embodiment. In particular, for the same eyelid movement information, the drowsiness estimation unit 291 lowers drowsiness estimation information (estimates drowsiness as being low) as the humidity becomes lower. As with the corrected drowsiness estimation information output by the drowsiness estimation information correction unit 191 of the first example embodiment, the corrected drowsiness estimation information output by the drowsiness estimation unit 291 may be a continuous value or a discrete value.

Figure 11:
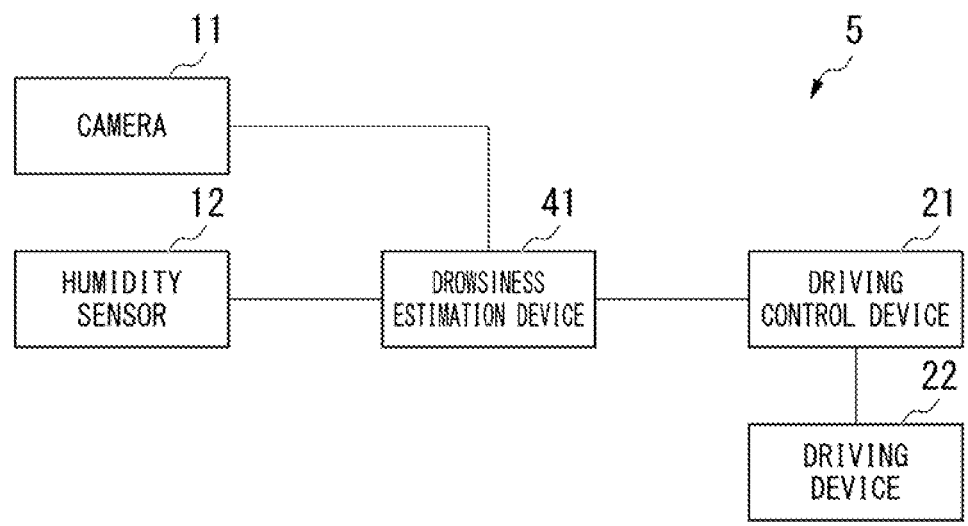
FIG. 11 is a diagram showing an example of a driving control system according to the second example embodiment.

FIG. 11 is a diagram showing an example of a driving control system according to the second example embodiment. In the configuration shown in FIG. 11, a driving control system 5 includes a camera 11, a humidity sensor 12, a drowsiness estimation device 41, a driving control device 21, and a driving device 22.

Of the components shown in FIG. 11, ones corresponding to those in FIG. 6 and having similar functions are given the same reference symbols (11, 12, 21, and 22), and descriptions thereof are omitted.

The driving control system 5 of FIG. 11 differs from the driving control system 2 of FIG. 6 in that the drowsiness estimation device 41 is provided in place of the drowsiness estimation device 13 and the drowsiness estimation information correction device 14. In other respects, the driving control system 5 is similar to the driving control system 2.

Moreover, the drowsiness estimation device 41 of FIG. 11 is similar to the drowsiness estimation device 41 of FIG. 8 and is given the same reference symbol, and description thereof is omitted.

In the example of FIG. 11, the drowsiness estimation device 41 calculates corrected drowsiness estimation information similar to that of the drowsiness estimation information correction device 14 of the first example embodiment, and the driving control system 5 functions in a manner similar to that of the driving control system 2 of FIG. 6.

Figure 12:
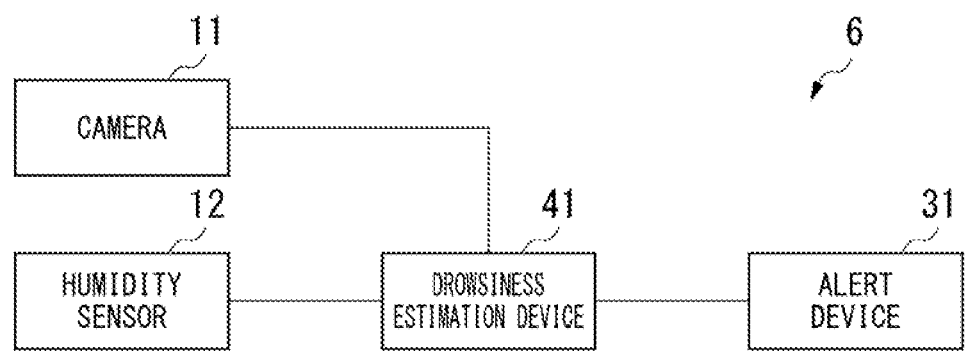
FIG. 12 is a diagram showing an example of an alert system according to the second example embodiment.

FIG. 12 is a diagram showing an example of an alert system according to the second example embodiment. In the configuration shown in FIG. 12, an alert system 6 includes a camera 11, a humidity sensor 12, a drowsiness estimation device 41, and an alert device 31.

Of the components shown in FIG. 12, ones corresponding to those in FIG. 7 and having similar functions are given the same reference symbols (11, 12, and 31), and descriptions thereof are omitted.

The alert system 6 of FIG. 12 differs from the alert system 3 of FIG. 7 in that the drowsiness estimation device 41 is provided in place of the drowsiness estimation device 13 and the drowsiness estimation information correction device 14. In other respects, the alert system 6 of FIG. 12 is similar to the alert system 3 of FIG. 7.

Moreover, the drowsiness estimation device 41 of FIG. 12 is similar to the drowsiness estimation device 41 of FIG. 8 and is given the same reference symbol, and description thereof is omitted.

In the example of FIG. 12, the drowsiness estimation device 41 calculates corrected drowsiness estimation information similar to that of the drowsiness estimation information correction device 14 of the first example embodiment, and the alert system 6 functions in a manner similar to that of the alert system 3 of FIG. 7.

As described above, the second communication unit 210 acquires eyelid movement information of a subject. Moreover, the drowsiness estimation unit 291 calculates drowsiness estimation information of the subject on the basis of the eyelid movement information and humidity information indicating the humidity in a surrounding environment of the subject.

As a result, the drowsiness estimation device 41 can reduce the accuracy degradation in estimation associated with the influence of the surrounding environment, when calculating the drowsiness estimation information of the subject.

Example of Drowsiness Estimation

Hereinafter, an example of drowsiness estimation information calculation performed by the drowsiness estimation device 13 described in the first example embodiment will be described. Also for the drowsiness estimation device 41 described in the second example embodiment, processing similar to that described below may be applied as a part of the processing for calculating corrected drowsiness estimation information on the basis of eyelid movement information and humidity information.

First Example

The drowsiness estimation device 13 performs image processing on a moving image signal, detects the degree of eye-opening of the subject, and acquires time-series information of the degree of eye-opening of the subject. The degree of eye-opening is information indicating the degree to which the subject has their eye open. The degree of eye-opening may be, for example, a ratio of the time during which the eye is open in a unit time, or may be a value obtained by accumulating the area of the open portion of the eye for each predetermined period. However, the degree of eye-opening is not limited to the information shown in these examples.

The drowsiness estimation device 13 may detect the degree of opening of the left eye and the degree of opening of the right eye, and acquire both the time-series information of the degree of opening of the left eye and the time-series information of the degree of opening of the right eye. In such a case, the drowsiness estimation device 13 may calculate the time-series information of the degree of eye-opening of the subject by summing and averaging the time-series information of the degree of opening of the left eye and the time-series information of the degree of opening of the right eye.

The drowsiness estimation device 13 sums and averages the time-series information $X_L$ (t) of the degree of opening of the left eye and the time-series information $X_R$ (t) of the degree of opening of the right eye to obtain the average value thereof, and outputs the average value as the time-series information X (t) of the degree of eye-opening of the subject. Therefore, the time-series information X (t) of the degree of eye-opening of the subject is expressed as Equation (4).

[Equation 4]

$$X(t) = \frac{X_L(t) + X_R(t)}{2} \quad (4)$$

The drowsiness estimation device 13 may use a value normalized to a value in a range from 0 to 1 as each of the time-series information $X_L$ (t) of the degree of opening of the left eye, the time-series information $X_R$ (t) of the degree of opening of the right eye, and the time-series information X (t) of the degree of eye-opening of the subject.

The drowsiness estimation device 13 may filter out changes induced by blinks of a subject 20 from the time-series information X (t) of the degree of eye-opening, and output the post-filtering time-series information $X_F$ (t) of the degree of eye-opening. The post-filtering time-series information $X_F$ (t) of the degree of eye-opening is expressed as Equation (5), for example.

[Equation 5]

$$X_F = F[X(t), \ldots, X(t-N+1)] \quad (5)$$

Here, F [ ] is an operator representing a filtering process. N represents the number of frames for the filtering process.

The drowsiness estimation device 13 performs the filtering process in units of filtering calculation window width $T_N$ [seconds]. There is a correlation represented by Equation (6) between the number of frames N, the filtering calculation window width $T_N$ [seconds], and the frame rate fs [frames/second].

[Equation 6]

$$N = T_N \times fs \quad (6)$$

For example, when the number of frames N is 3 and the frame rate fs is equal to 30 [frames/second], the filtering calculation window width $T_N$ [seconds] is "3/30=0.1 [seconds]".

In this example, the drowsiness estimation device 13 replaces the time-series information X (t) of the degree of eye-opening with a predetermined value by filtering in units of the filtering calculation window width $T_N$ [seconds], and outputs the replaced value as the post-filtering time-series information $X_F$ (t) of the degree of eye-opening.

The drowsiness estimation device 13 may use the time-series information $X_L$ (t) of the degree of opening of the left eye and the time-series information $X_R$ (t) of the degree of opening of the right eye in addition to or in place of the time-series information X (t) of the degree of eye-opening.

For example, the drowsiness estimation device 13 replaces the time-series information X (t) of the degree of eye-opening with a predetermined primary value by filtering in units of the filtering calculation window width $T_N$ [seconds], and outputs the replaced value as the post-filtering time-series information $X_F$ (t) of the degree of eye-opening.

Moreover, the drowsiness estimation device 13 replaces the time-series information $X_L$ (t) of the degree of opening of the left eye with a predetermined first sub value by filtering in units of the filtering calculation window width $T_N$ [seconds], and outputs the replaced value as the post-filtering time-series information $X_{FL}$ (t) of the degree of opening of the left eye.

Similarly, the drowsiness estimation device 13 replaces the time-series information $X_R$ (t) of the degree of opening of the right eye with a predetermined second value by filtering in units of the filtering calculation window width $T_N$ [seconds], and outputs the replaced value as the post-filtering time-series information $X_{FR}$ (t) of the degree of opening of the right eye.

The drowsiness estimation device 13 may perform only one of the above three filtering operations. As the filtering process performed by the drowsiness estimation device 13, various methods may be employed.

Next, a specific example of the filtering process performed by the drowsiness estimation device 13 will be described.

Filtering performed by the drowsiness estimation device 13 is applicable when the filtering calculation window width $T_N$ [seconds] is at least 0.1 [seconds] or more ($T_N \geq 0.1$). The reason for this is that the blink time is 0.1 to 0.15 [seconds]. For example, in the case where the frame rate fs is 30 [frames/second], filtering performed by the drowsiness estimation device 13 can be applied when the number of frames N is 3 or more. In the following, a case where the number of frames N is equal to 30 and the filtering calculation window width $T_N$ [seconds] is 1 [second] will be described as an example; however, the example embodiment is not limited to such an example.

The drowsiness estimation device 13 acquires the maximum value of the time-series information X (t) of the degree of eye-opening by performing filtering in units of the filtering calculation window width $T_N$ [seconds], and outputs the acquired maximum value as the post-filtering time-series information $X_F$ (t) of the degree of eye-opening.

As shown by Equation (7), the drowsiness estimation device 13 takes the maximum value of the time-series information X (t) of the eye-opening degree within the filtering calculation window width $T_N$ [seconds].

[Equation 7]

$$X_F = \max[X(t), \ldots, X(t-N+1)] \quad (7)$$

max [ ] is an operator that takes the maximum value of an element. The drowsiness estimation device 13 performs this filtering to thereby remove changes associated with blinking from the time-series information of the degree of eye-opening.

Moreover, in the state where the subject is wakeful, the degree of eye-opening can be maintained constant. On the other hand, in the state where the subject is drowsy, the degree of eye-opening cannot be maintained constant. In particular, in the state where the subject is drowsy, it is conceivable that the degree of eye-opening is always lower than that in the case where the subject is wakeful, and that the maximum value of the degree of eye-opening obtained by filtering also becomes smaller. It is conceivable that the higher the level of the subject's drowsiness, the smaller the value of the post-filtering time-series information $X_F$ (t) of the degree of eye-opening becomes.

The time-series information of the degree of eye-opening output by the drowsiness estimation device 13 in the first example corresponds to an example of drowsiness estimation information. The drowsiness estimation device 13 may output any one of unfiltered X (t), $X_L$ (t), $X_R$ (t), or a combination thereof as drowsiness estimation information. Alternatively, the drowsiness estimation device 13 may output any one of filtered $X_F$ (t), $X_{FL}$ (t), $X_{FR}$ (t), or a combination thereof as drowsiness estimation information.

The drowsiness estimation information correction device 14 performs the above correction on the drowsiness estimation information output by the drowsiness estimation device 13, and outputs the corrected drowsiness estimation information.

Alternatively, the drowsiness estimation device 13 may calculate the degree of variation in the post-filtering time-series information $X_F$ (t) of the degree of eye-opening, and output the calculated degree of variation as a first feature F1 (T). In such a case, the first feature F1 (T) corresponds to an example of drowsiness estimation information.

The first feature F1 (T) is expressed as Equation (8).

[Equation 8]

$$F1(T)=V[X_F(T\times M+t), \ldots, X_F(T\times M+t-M+1)] \quad (8)$$

Here, T represents time indexes and indicates the window number (0, 1, 2, . . . ) of the feature calculation window.

V [ ] is an operator that calculates the degree of variation. As the degree of variation referred to here, various types of values such as variance, standard deviation, difference between the maximum value and the minimum value, or entropy can be used.

M represents the number of frames for a feature extraction process. It is expressed as "M=$T_M$×fs", using a feature calculation window $T_M$ [seconds] and the frame rate fs [frames/second].

It should be noted that the data used by the drowsiness estimation device 13 is not limited to the post-filtering time-series information $X_F$ (t) of the degree of eye-opening shown in Equation (8). The drowsiness estimation device 13 may use the post-filtering time-series information $X_{FL}$ (t) of the degree of opening of the left eye or the post-filtering time-series information $X_{FR}$ (t) of the degree of opening of the right eye in place of the post-filtering time-series information $X_F$ (t) of the degree of eye-opening of Equation (8).

For example, the drowsiness estimation device 13 may calculate the degree of variation in the post-filtering time-series information $X_{FL}$ (t) of the degree of opening of the left eye within the feature calculation window $T_M$ [seconds], and output the degree of variation as the first feature F1 (T). Moreover, the drowsiness estimation device 13 may calculate the degree of variation in the post-filtering time-series information $X_{FR}$ (t) of the degree of opening of the right eye within the feature calculation window $T_M$ [seconds], and output the degree of variation as the first feature F1 (T).

In such a case, the first feature F1 (T) corresponds to an example of drowsiness estimation information.

Second Example

A second example is similar to the case of the first example, except that the feature calculation process differs from that of the first example as described later.

In the second example, the drowsiness estimation device 13 calculates the absolute value of the difference between frames of the time-series information X (t) of the degree of eye-opening (hereinafter, referred to as "difference between frames"), obtains the maximum value of the difference between frames within the feature calculation window width ($T_M$) [seconds], and outputs the maximum value as a second feature F2 (T).

Therefore, the drowsiness estimation device 13 calculates the second feature F2 (T) from the time-series information X (t) of the degree of eye-opening and outputs it. The maximum value of the absolute value of the difference between frames is useful for estimating drowsiness because the value thereof becomes smaller in a drowsy state and becomes greater in a wakeful state.

The maximum value of the difference between frames, that is, the second feature F2 (T) is expressed as Equation (9).

[Equation 9]

$$F2(T)=1-\max[|X(T\times M+t)-X(T\times M+t-1)|, \ldots, |X(T\times M+t-M+1)-X(T\times M+t-M+1-1)|] \quad (9)$$

Here, the reason for "1−max [ ]" being used is so that the lower the drowsiness level is, the smaller the value should become as with the other feature.

It should be noted that the data used by the drowsiness estimation device 13 is not limited to the time-series information X (t) of the degree of eye-opening shown in Equation (9). The drowsiness estimation device 13 may use the time-series information $X_L$ (t) of the degree of opening of the left eye or the time-series information $X_R$ (t) of the degree of opening of the right eye in place of the time-series information X (t) of the degree of eye-opening of Equation (9).

For example, the drowsiness estimation device 13 may calculate the maximum value of the difference between frames in the time-series information $X_L$ (t) of the degree of opening of the left eye within the feature calculation window $T_M$ [seconds], and output the maximum value as the second feature F2 (T). Moreover, the drowsiness estimation device 13 may calculate the maximum value of the difference between frames in the time-series information $X_R$ (t) of the degree of opening of the right eye within the feature calculation window $T_M$ [seconds], and output the maximum value as the second feature F2 (T).

The second feature F2 (T) output by the drowsiness estimation device 13 in the second example corresponds to an example of drowsiness estimation information. The drowsiness estimation information correction device 14 performs the above correction on the drowsiness estimation information (second feature F2 (T)) output by the drowsiness estimation device 13, and outputs the corrected drowsiness estimation information.

Third Example

A third example is similar to the first example, except that the feature calculation process thereof differs from that of the first example.

In the third example, the drowsiness estimation device 13 detects eye closure from the time-series information X (T) of the degree of eye-opening, obtains the eye closure ratio (ratio of eye closure) within the feature calculation window width ($T_M$) [seconds], and outputs the eye closure ratio as a third feature F3 (T). Therefore, the drowsiness estimation device 13 calculates the third feature F3 (T) from the time-series information X (t) of the degree of eye-opening and outputs it. The eye closure is useful for estimating drowsiness because the value becomes greater in a drowsy state and becomes smaller in a wakeful state.

The eye closure ratio, that is, the third feature F3 (T) is expressed as Equation (10).

[Equation 10]

$$F3(T) = \frac{C}{M} \quad (10)$$

Here, C is the number of elements below an eye closure determination threshold value (for example, 0.5) among the elements of the time-series information [X (T×M+t), ..., X (T×M+t−M+1)] of the degree of eye-opening included in the feature calculation window width ($T_M$) [seconds].

It should be noted that the drowsiness estimation device 13 may, for calculating the third feature F3 (T), use the time-series information $X_L$ (t) of the degree of opening of the left eye or the time-series information $X_R$ (t) of the degree of opening of the right eye in place of the time-series information X (t) of the degree of eye-opening. In such a case, the drowsiness estimation device 13 calculates the eye closure ratio of the time-series information $X_L$ (t) of the degree of opening of the left eye within the feature calculation window $T_M$ [seconds], and outputs the eye closure ratio as the third feature F3 (T). Moreover, the drowsiness estimation device 13 calculates the eye closure ratio of the time-series information $X_R$ (t) of the degree of opening of the right eye within the feature calculation window $T_M$ [seconds], and outputs the eye closure ratio as the third feature F3 (T).

Moreover, the drowsiness estimation device 13 may calculate the closure ratio of both eyes closed at the same time of the time-series information $X_L$ (t) of the degree of opening of the left eye and the time-series information $X_R$ (t) of the degree of opening of the right eye, and output the eye closure ratio as the third feature F3 (T). Also, the drowsiness estimation device 13 may calculate both the closure ratio of the time-series information $X_L$ (t) of the degree of opening of the left eye and the time-series information $X_R$ (t) of the degree of opening of the right eye, and output the third feature F3 (T)=[eye closure ratio of $X_L$ (t), eye closure ratio of $X_R$ (t)] that takes those closure ratios as elements thereof. Moreover, the drowsiness estimation device 13 may calculate a plurality of eye closure ratios using a plurality of eye closure determination threshold values (such as 0.5 and 0.8, for example), and output the third feature F3 (T)=[eye closure ratio when eye closure determination threshold value is 0.5, and eye closure ratio when eye closure determination threshold value is 0.8] that takes those closure ratios as elements thereof.

The third feature F3 (T) output by the drowsiness estimation device 13 in the third example corresponds to an example of drowsiness estimation information. The drowsiness estimation information correction device 14 performs the above correction on the drowsiness estimation information (third feature F3 (T)) output by the drowsiness estimation device 13, and outputs the corrected drowsiness estimation information.

Fourth Example

A fourth example is similar to the first example, except that the feature calculation process thereof differs from that of the first example.

In the fourth example, the drowsiness estimation device 13 calculates the absolute value of the movement difference between the time-series information $X_L$ (t) of the degree of opening of the left eye and the time-series information $X_R$ (t) of the degree of opening of the right eye (hereinafter, referred to as "movement difference"), obtains the average value of the above movement differences within the feature calculation window width ($T_M$) [seconds], and outputs the average value of the movement differences as a fourth feature F4 (T).

Therefore, the drowsiness estimation device 13 calculates the fourth feature F4 (T) from the time-series information X (t) of the degree of eye-opening and outputs it. This movement difference average value is useful for estimating drowsiness because the value becomes greater in a drowsy state and becomes smaller in a wakeful state.

The average value of the movement differences, that is, the fourth feature F4 (T) is expressed as Equation (11).

[Equation 11]

$$F4(T)=\text{average}[|\{X_L(T\times M+t)-X_L(T\times M+t-1)\}-X_R(T\times M+t)-X_R(T\times M+t-1)|,\ldots,|\{X_L(T\times M+t-M+1)-X_L(T\times M+t-M+1-1)\}-\{X_R(T\times M+t-M+1)-X_R(T\times M+t-M+1-1)\}|] \quad (11)$$

The fourth feature F4 (T) output by the drowsiness estimation device 13 in the fourth example corresponds to an example of drowsiness estimation information. The drowsiness estimation information correction device 14 performs the above correction on the drowsiness estimation information (fourth feature F4 (T)) output by the drowsiness estimation device 13, and outputs the corrected drowsiness estimation information.

Fifth Example

A fifth example is similar to the first example, except that the feature calculation process thereof differs from that of the first example.

In the fifth example, the drowsiness estimation device 13 calculates the absolute value of the difference between the first feature F1 (T) calculated in a given feature calculation window width ($T_M$) [seconds] and the first feature F1 (T−1) calculated in an adjacent feature calculation window width ($T_M$) [seconds] (hereinafter, referred to as "difference between adjacent windows"), and outputs the difference between the adjacent windows as a fifth feature F5 (T).

Therefore, the drowsiness estimation device 13 calculates the difference between adjacent windows in the first feature F1 (T), as the fifth feature F5 (T) and outputs it. This difference between adjacent windows is useful for estimating drowsiness because the value becomes greater in a drowsy state and becomes less in a wakeful state.

The difference between adjacent windows, that is, the fifth feature F5 (T) is expressed as Equation (12).

[Equation 12]

$$F5(T)=|F1(T)-F1(T-1)| \quad (12)$$

It should be noted that the drowsiness estimation device 13 may, in place of the difference between adjacent windows in the first feature F1 (T), calculate the difference between adjacent windows in the second feature F2 (T), the difference between adjacent windows in the third feature F3 (T), or the difference between adjacent windows in the fourth feature F4 (T), as the fifth feature F5 (T) and output it.

The fifth feature F5 (T) output by the drowsiness estimation device 13 in the fifth example corresponds to an example of drowsiness estimation information. The drowsiness estimation information correction device 14 performs the above correction on the drowsiness estimation information (fifth feature F5 (T)) output by the drowsiness estimation device 13, and outputs the corrected drowsiness estimation information.

Sixth Example

A sixth example is similar to the first example, except that the feature calculation process thereof differs from that of the first example.

In the sixth example, the drowsiness estimation device 13 calculates the logarithm of the first feature F1 (T) and outputs the logarithm as a sixth feature F6 (T). Therefore, the drowsiness estimation device 13 calculates and outputs the logarithm of the first feature F1 (T), as the fifth feature F6 (T). Here, it is generally said that human perception follows a logarithmic scale. By taking the logarithm of the first feature F1 (T), the drowsiness estimation device 13 can output drowsiness estimation information that is close to human perception.

The logarithm of the first feature, that is, the sixth feature F6 (T) is expressed as Equation (13).

[Equation 13]

$$F6(T)=\log\{F1(T)+\alpha\} \quad (13)$$

Here, a is a small positive value, for example, $10^{-6}$. The reason why a small positive value a is added to the first feature quantity F1 (T) is that the contents of the logarithm will not become zero.

It should be noted that the drowsiness estimation device 13 may, in place of the logarithm of the first feature F1 (T), calculate and output the logarithm of the second feature F2 (T), the logarithm of the third feature F3 (T), the logarithm of the fourth feature F4 (T), or the logarithm of the fifth feature F5 (T), as the sixth feature F6 (T).

The sixth feature F6 (T) output by the drowsiness estimation device 13 in the sixth example corresponds to an example of drowsiness estimation information. The drowsiness estimation information correction device 14 performs the above correction on the drowsiness estimation information (sixth feature F6 (T)) output by the drowsiness estimation device 13, and outputs the corrected drowsiness estimation information.

The sixth feature F6 (T) output by the drowsiness estimation device 13 in the sixth example corresponds to an example of drowsiness estimation information. The drowsiness estimation information correction device 14 performs the above correction on the drowsiness estimation information (sixth feature F6 (T)) output by the drowsiness estimation device 13, and outputs the corrected drowsiness estimation information.

Seventh Example

A seventh example is similar to the first example, except that the feature calculation process thereof differs from that of the first example.

In the seventh example to the ninth example, as will be described later, for each statistical amount calculation window width $T_K$ [seconds], the drowsiness estimation device 13 calculates statistical amounts F7 (S) to F9 (S) of the features (for example, first feature F1 (T)) mentioned above and uses them as features. Here, S represents time indexes and indicates the window number (0, 1, 2, . . . ) of the statistical amount calculation window. For example, assume that the number of first features T1 (T) within the statistical amount calculation window width $T_K$ [seconds] is K.

In the seventh example, the drowsiness estimation device 13 using the first feature (F1 (T) as the feature described above and uses the average value of the first features F1 (T) as a statistical amount. The drowsiness estimation device 13 calculates the average value of the first features F1 (T) within the statistical amount calculation window width $T_K$ [seconds], and outputs the average value as the seventh feature F7 (S). Therefore, for each statistical amount calculation window width $T_K$ [seconds], the drowsiness estimation device 13 calculates and outputs the average value of the first features F1 (T), as a seventh feature F7 (S).

The average value of the first features, that is, the seventh feature F7 (S) is expressed as Equation (14).

[Equation 14]

$$F7(S)=\text{average}[F1(S \times K+T), \ldots, F1(S \times K+T-K+1)] \quad (14)$$

average [ ] is an operator that calculates the average value of elements.

The value of T in Equation (14) serves as an offset that indicates the correlation between the window number of the feature calculation windows when obtaining the first feature and the window number of the feature calculation windows when obtaining the seventh feature F7.

The drowsiness estimation device 13 may, in place of the average value of the first features F1 (T), use the average value of the second features F2 (T), the average value of the third features F3 (T), the average value of the fourth features F4 (T), the average value of the fifth features F5 (T), or the average value of the sixth features F6 (T), to calculate and output the seventh feature F7 (S).

The seventh feature F7 (S) output by the drowsiness estimation device 13 in the seventh example corresponds to an example of drowsiness estimation information. The drowsiness estimation information correction device 14 performs the above correction on the drowsiness estimation information (seventh feature F7 (S)) output by the drowsiness estimation device 13, and outputs the corrected drowsiness estimation information.

Eighth Example

An eighth example is similar to the first example, except that the feature calculation process thereof differs from that of the first example.

In the eighth example, the drowsiness estimation device 13 calculates the standard deviation of the first features F1 (T) within the statistical amount calculation window width $T_K$ [seconds], and outputs the standard deviation as an eighth feature F8 (S).

Therefore, for each statistical amount calculation window width $T_K$ [seconds], the drowsiness estimation device 13 calculates and outputs the standard deviation of the first features F1 (T), as the eighth feature F8 (S).

The standard deviation of the first features, that is, the eighth feature F8 (S) is expressed as Equation (15).

[Equation 15]

$$F8(S)=\text{standard\_dev}[F1(S \times K+T), \ldots ,F1(S \times K+T-K+1)] \quad (15)$$

standard_dev [ ] is an operator that calculates the standard deviation of elements.

The value of T in Equation (15) serves as an offset that indicates the correlation between the window number of the feature calculation windows when obtaining the first feature and the window number of the feature calculation windows when obtaining the eighth feature F8.

The drowsiness estimation device 13 may, in place of the first features F1 (T), calculate and output the standard deviation of the second features F2 (T), the third features F3 (T), the fourth features F4 (T), the fifth features F5 (T), or the sixth features F6 (T), as the eighth feature F8 (S).

The eighth feature F8 (S) output by the drowsiness estimation device 13 in the eighth example corresponds to an example of drowsiness estimation information. The drowsiness estimation information correction device 14 performs the above correction on the drowsiness estimation information (eighth feature F8 (S)) output by the drowsiness estimation device 13, and outputs the corrected drowsiness estimation information.

Ninth Example

A ninth example is similar to the first example, except that the feature calculation process thereof differs from that of the first example.

In the ninth example, the drowsiness estimation device 13 calculates the variance of the first features F1 (T) within the statistical amount calculation window width $T_K$ [seconds], and outputs the variance as a ninth feature F9 (S). Therefore, for each statistical amount calculation window width $T_K$ [seconds], the drowsiness estimation device 13 calculates and outputs the variance of the first features F1 (T), as the ninth feature F9 (S).

The variance of the first features, that is, the ninth feature F9 (S) is expressed as Equation (16).

[Equation 16]

$$F9(S)=\text{variance}[F1(S \times K+T), \ldots ,F1(S \times K+T-K+1)] \quad (16)$$

variance [ ] is an operator that calculates the variance value of elements.

The value of T in Equation (16) serves as an offset that indicates the correlation between the window number of the feature calculation windows when obtaining the first feature F1, and the window number of the feature calculation windows when obtaining the ninth feature F9.

The drowsiness estimation device 13 may, in place of the variance of the first features F1 (T), calculate and output the variance of the second features F2 (T), the variance of the third features F3 (T), the variance of the fourth feature F4 (T), the variance of the fifth feature F5 (T), or the variance of the sixth features F6 (T), as the ninth feature F9 (T).

The ninth feature F9 (S) output by the drowsiness estimation device 13 in the ninth example corresponds to an example of drowsiness estimation information. The drowsiness estimation information correction device 14 performs the above correction on the drowsiness estimation information (ninth feature F9 (S)) output by the drowsiness estimation device 13, and outputs the corrected drowsiness estimation information.

The drowsiness estimation device 13 may output only one of the above features F1 (T) to F9 (S) as drowsiness estimation information. Alternatively, the drowsiness estimation device 13 may output more than one of the above features F1 (T) to F9 (S) as drowsiness estimation information.

Configuration Example of Example Embodiment

Next, a configuration example of the example embodiment will be described, with reference to FIG. 13 to FIG. 16.

Figure 13:
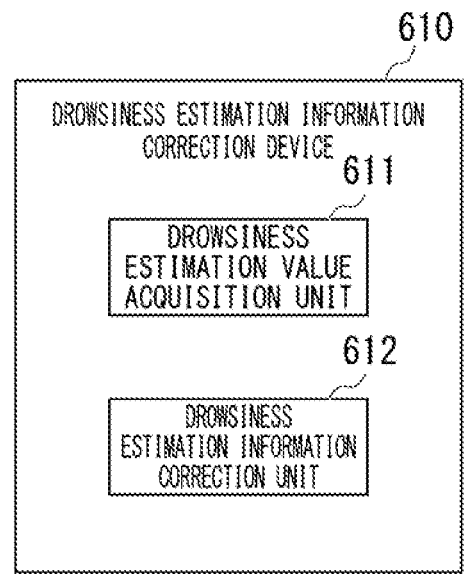
FIG. 13 is a diagram showing an example of a configuration of an arousal level control device according to an example embodiment.

FIG. 13 is a diagram showing a configuration example of a drowsiness estimation information correction device according to the example embodiment. The drowsiness estimation information correction device 610 shown in FIG. 13 includes a drowsiness estimation information acquisition unit 611 and a drowsiness estimation information correction unit 612.

In this configuration, the drowsiness estimation information acquisition unit 611 acquires drowsiness estimation information on the basis of the eyelid movement of a subject. The drowsiness estimation information correction unit 612 calculates corrected drowsiness estimation information obtained by correcting the drowsiness estimation information acquired by the drowsiness estimation information acquisition unit 611, with humidity information indicating the humidity in the surrounding environment of the subject.

As a result, the drowsiness estimation information correction device 610 can reduce the accuracy degradation in estimation associated with the influence of the surrounding environment, when calculating the drowsiness estimation information (corrected drowsiness estimation information) of the subject.

Figure 14:
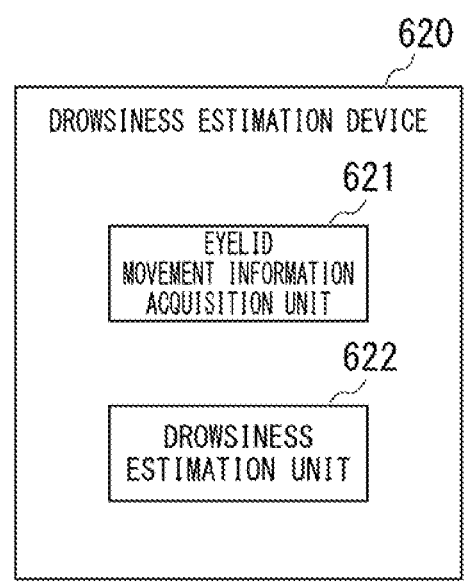
FIG. 14 is a diagram showing an example of a configuration of an arousal level characteristic display device according to an example embodiment.

FIG. 14 is a diagram showing a configuration example of a drowsiness estimation device according to the example embodiment. The drowsiness estimation device 620 shown in FIG. 14 includes an eyelid movement information acquisition unit 621 and a drowsiness estimation unit 622.

In this configuration, the eyelid movement information acquisition unit 621 acquires eyelid movement information on the basis of the eyelid movement of a subject. The drowsiness estimation unit 622 calculates drowsiness estimation information of the subject on the basis of the eyelid movement information acquired by the eyelid movement information acquisition unit 621 and humidity information indicating the humidity in a surrounding environment of the subject.

As a result, in the drowsiness estimation device 620, it is possible to reduce degradation of estimation accuracy when estimating drowsiness of a subject. In particular, in the drowsiness estimation device 620, it is possible to avoid or reduce degradation of drowsiness estimation accuracy caused by the influence of humidity in the subject's surrounding environment.

Figure 15:
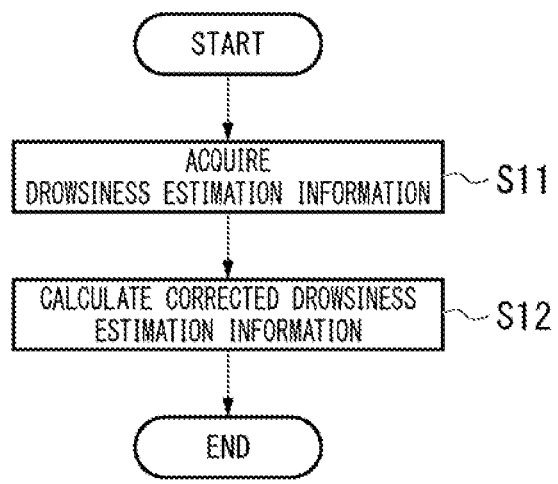
FIG. 15 is a diagram showing an example of a processing procedure in an arousal level control method according to an example embodiment.

FIG. 15 is a diagram showing an example of a processing procedure in a drowsiness estimation information correction method according to the example embodiment.

In the processing of FIG. 15, drowsiness estimation information on the basis of eyelid movement of the subject is acquired (Step S11), and corrected drowsiness estimation information that has corrected the acquired drowsiness estimation information with humidity information indicating the humidity in the surrounding environment of the subject is calculated (Step S12).

According to this drowsiness estimation information correction method, it is possible to reduce degradation of estimation accuracy when estimating the drowsiness of a subject. In particular, in the drowsiness estimation correction information related to the processing of FIG. 15, it is possible to avoid or reduce degradation of drowsiness estimation accuracy caused by the influence of humidity in the subject's surrounding environment when calculating the drowsiness estimation information (corrected drowsiness estimation information) of the subject.

Figure 16:
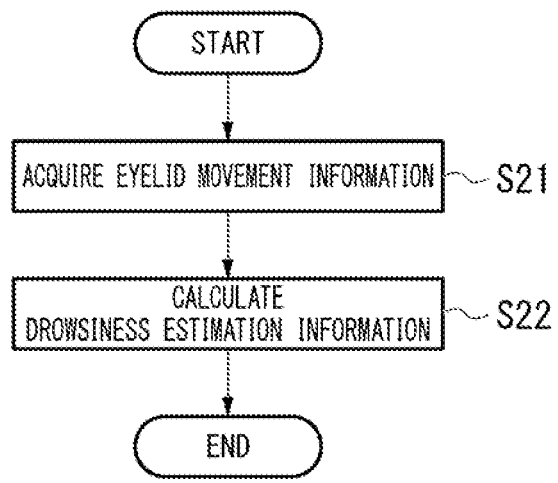
FIG. 16 is a diagram showing an example of a processing procedure in an arousal level characteristic display method according to an example embodiment.

FIG. 16 is a diagram showing an example of a processing procedure in a drowsiness estimation method according to the example embodiment.

In the processing of FIG. 16, eyelid movement information of the subject is acquired (Step S21), and drowsiness estimation information of the subject is calculated on the basis of the acquired movement information and humidity information indicating the humidity of the surrounding environment of the subject (Step S22).

According to this drowsiness estimation method, it is possible to reduce degradation of estimation accuracy when estimating the drowsiness of a subject. In particular, in the drowsiness estimation method related to the processing of FIG. 16, it is possible to avoid or reduce degradation of drowsiness estimation accuracy caused by the influence of humidity in the subject's surrounding environment.

Figure 17:
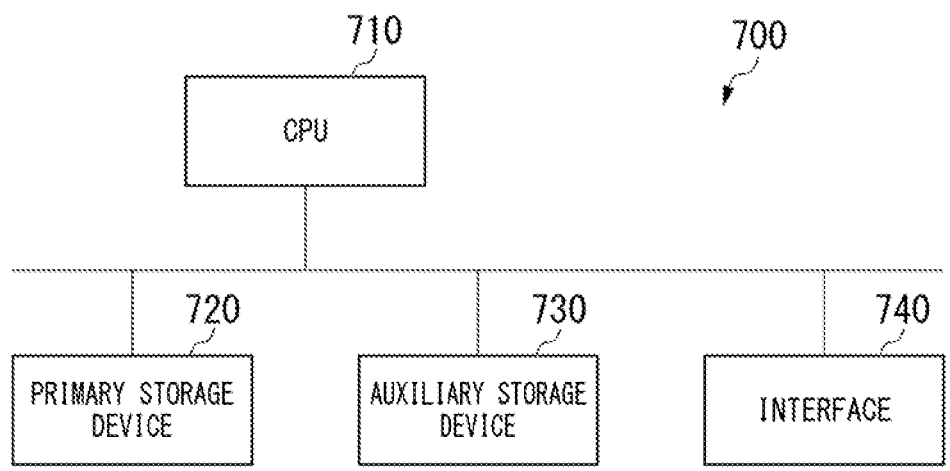
FIG. 17 is a schematic block diagram showing a configuration of a computer according to at least one example embodiment.

FIG. 17 is a schematic block diagram showing a configuration of a computer according to at least one example embodiment.

In the configuration shown in FIG. 17, a computer 700 includes a CPU 710, a main storage device 720, an auxiliary storage device 730, and an interface 740.

One or more of the drowsiness estimation information correction device 14, the drowsiness estimation device 41, the drowsiness estimation information correction device 610, and the drowsiness estimation device 620 may be implemented in the computer 700. In such a case, operations of the respective processing units described above are stored in the auxiliary storage device 730 in the form of program. The CPU 710 reads the program from the auxiliary storage device 730, loads it on the main storage device 720, and executes the processing described above according to the program. Moreover, the CPU 710 secures, according to the program, storage regions corresponding to the respective storage units mentioned above, in the main storage device 720. Communication between each device and another device is executed by the interface 740 having a communication function and communicating according to the control of the CPU 710.

In the case where the drowsiness estimation information correction device 14 is implemented in the computer 700, operations of the first control unit 190 and each component thereof are stored in the auxiliary storage device 730 in the form of a program. The CPU 710 reads the program from the auxiliary storage device 730, loads it on the main storage device 720, and executes the processing described above according to the program.

Moreover, the CPU 710 secures, according to the program, a storage region corresponding to the first storage unit 180, in the main storage device 720. Communication performed by the first communication unit 110 is executed by the interface 740 having a communication function and communicating according to the control of the CPU 710.

In the case where the drowsiness estimation device 41 is implemented in the computer 700, operations of the second control unit 290 and each component thereof are stored in the auxiliary storage device 730 in the form of a program. The CPU 710 reads the program from the auxiliary storage device 730, loads it on the main storage device 720, and executes the processing described above according to the program.

Moreover, the CPU 710 secures, according to the program, a storage region corresponding to the second storage unit 280, in the main storage device 720. Communication performed by the second communication unit 210 is executed by the interface 740 having a communication function and communicating according to the control of the CPU 710.

In the case where the drowsiness estimation information correction device 610 is implemented in the computer 700, operations of the drowsiness estimation information correction unit 612 are stored in the auxiliary storage device 730 in the form of a program. The CPU 710 reads the program from the auxiliary storage device 730, loads it on the main storage device 720, and executes the processing described above according to the program.

Moreover, operations of the drowsiness estimation information acquisition unit 611 are executed by the interface 740 having a communication function and communicating according to the control of the CPU 710.

In the case where the drowsiness estimation device 620 is implemented in the computer 700, operations of the drowsiness estimation unit 622 are stored in the auxiliary storage device 730 in the form of a program. The CPU 710 reads the program from the auxiliary storage device 730, loads it on the main storage device 720, and executes the processing described above according to the program.

Also, operations of the eyelid movement information acquisition unit 621 are executed by the interface 740 having a communication function and communicating according to the control of the CPU 710.

It should be noted that a program for realizing all or part of the functions of the drowsiness estimation information correction device 14, the drowsiness estimation device 41, the drowsiness estimation information correction value 610, or the drowsiness estimation device 620 may be recorded on a computer-readable recording medium, and the program recorded on the recording medium may be read into and executed on a computer system, to thereby perform the processing of each unit. The "computer system" referred to here includes an OS (operating system) and hardware such as peripheral devices.

Moreover, the "computer-readable recording medium" referred to here refers to a portable medium such as a flexible disk, a magneto-optical disk, a ROM (Read Only Memory), and a CD-ROM (Compact Disc Read Only Memory), or a storage device such as a hard disk built in a computer system. The above program may be a program for realizing a part of the functions described above, and may be a program capable of realizing the functions described above in combination with a program already recorded in a computer system.

The example embodiments of the present invention have been described in detail with reference to the drawings. However, the specific configuration of the invention is not limited to the example embodiments, and may include design changes and so forth that do not depart from the scope of the present invention.

This application is based upon and claims the benefit of priority from Japanese patent application No. 2019-134835, filed Jul. 22, 2019, the disclosure of which is incorporated herein in its entirety by reference.

INDUSTRIAL APPLICABILITY

The present invention may be applied to a drowsiness estimation information correction device, a drowsiness estimation device, a drowsiness estimation information correction method, a drowsiness estimation method, and a recording medium.

DESCRIPTION OF REFERENCE SYMBOLS 1, 4 Arousal level control system
2, 5 Driving control system
3, 6 Alert system
11 Camera
12 Humidity sensor
13 Drowsiness estimation device
14 Drowsiness estimation information correction device
15 Arousal level control device
16 Environment control device
21 Driving control device
22 Driving device
31 Alert device
41 Drowsiness estimation device
110 First communication unit (first communication means)
180 First storage unit (first storage means)
181 Correction model storage unit (correction model storage means)
190 First control unit (first control means)
191 Drowsiness estimation information correction unit (drowsiness estimation information correction means)

What is claimed is:

1. A system comprising:
a drowsiness estimation information correction device comprising:
  at least one memory configured to store instructions;
  at least one processor configured to execute the instructions to:
    acquire drowsiness estimation information that is based on an eyelid movement of a subject; and
    generate corrected drowsiness estimation information obtained by correcting the drowsiness estimation information with humidity information indicating humidity in a surrounding environment of the subject, wherein generating the corrected drowsiness estimation information comprises making a correction so that the lower the humidity is, the smaller the corrected drowsiness estimation information becomes; and
a controller that controls an arousal level of the subject based on the corrected drowsiness estimation information.

2. The system according to claim 1, wherein the at least one processor is configured to execute the instructions to, in a case where the humidity is higher than an upper limit threshold value, make a correction of a same correction amount as that in a case where the humidity is equal to the upper limit threshold value.

3. The system according to claim 1, wherein the at least one processor is configured to execute the instructions to, in a case where the humidity is lower than a lower limit threshold value, make a correction of a same correction amount as that in a case where the humidity is equal to the lower limit threshold value.

4. A system comprising:
a drowsiness estimation information correction device comprising:
  at least one memory configured to store instructions;
  at least one processor configured to execute the instructions to:
    acquire drowsiness estimation information that is based on an eyelid movement of a subject; and
    generate corrected drowsiness estimation information obtained by correcting the drowsiness estimation information with humidity information indicating humidity in a surrounding environment of the subject, wherein generating the corrected drowsiness estimation information comprises making a correction so that the lower the humidity is, the smaller the corrected drowsiness estimation information becomes; and
a controller that changes a physical quantity in the surrounding environment of the subject based on the corrected drowsiness estimation information to control an arousal level of the subject.

5. A system comprising:
a drowsiness estimation device comprising:
  at least one memory configured to store instructions;
  at least one processor configured to execute the instructions to:
    acquire information on an eyelid movement of a subject; and
    generate drowsiness estimation information of the subject, based on the information on the eyelid movement and humidity information indicating humidity in a surrounding environment of the subject, wherein generating the drowsiness estimation information comprises lowering the drowsiness estimation information as the humidity becomes lower; and
a controller that controls an arousal level of the subject based on the drowsiness estimation information.

* * * * *